United States Patent [19]
Kneale

[11] Patent Number: 5,283,585
[45] Date of Patent: Feb. 1, 1994

[54] METHOD AND SYSTEM FOR AZIMUTH/ELEVATION TARGET SIMULATION

[75] Inventor: James B. Kneale, Elkridge, Md.

[73] Assignee: Westinghouse Electric Corp., Pittsburgh, Pa.

[21] Appl. No.: 946,711

[22] Filed: Sep. 18, 1992

[51] Int. Cl.$^5$ .............................................. G01S 7/40
[52] U.S. Cl. ................................................... 342/169
[58] Field of Search ....................... 342/165, 169, 170

[56] References Cited
U.S. PATENT DOCUMENTS

| | | | |
|---|---|---|---|
| 4,199,874 | 4/1980 | Koshevoi et al. | 434/2 |
| 4,982,196 | 1/1991 | Thomas et al. | 342/169 X |
| 5,047,782 | 9/1991 | Lew et al. | 342/169 |
| 5,138,325 | 8/1992 | Koury | 342/169 |

Primary Examiner—T. H. Tubbesing
Attorney, Agent, or Firm—Norman A. Nixon

[57] ABSTRACT

A system for simulating a moving target, having an antenna that emits a steerable propagation pattern, a receiver and a target signal generator. Analog signals representing the azimuth position of the target and the azimuth position of the antenna propagation pattern are summed yielding analog azimuth position signals. The analog azimuth position signals are then converted to digital code. Analog signals representing the elevation position of the target and the elevation position of the propagation pattern are summed yielding analog elevation position signals. The analog elevation position signals are then converted to digital code. The azimuth position digital code and digital code representing the propagation pattern direction are input into a memory unit which outputs an azimuth attenuation digital code. The elevation position digital code and the propagation pattern direction digital code are likewise input into a memory to produce an elevation attenuation digital code. The azimuth and elevation attenuation digital codes are combined and converted into analog for attenuating the target signal. The attenuated target signal is then input into the receiver of the radar tracking system.

8 Claims, 3 Drawing Sheets

METHOD AND SYSTEM FOR AZIMUTH/ELEVATION TARGET SIMULATION

BACKGROUND OF THE INVENTION

1. Field of the Invention

Invention relates generally to the field of radar testing systems and more particularly to radar testing systems in which a simulated target is inputed directly into the receiver.

2. Description of the Prior Art

For radar systems, it is often necessary to run tracking tests. For these tests it is necessary to simulate targets for the radar system to track. It is both inconvenient and expensive to provide drone targets for the radar system to track. Therefore, the art has developed target simulation systems which utilize electromagnetic signals in the target simulation.

Target simulation is known in which a target generator generates a radio frequency (RF) signal analogous to a target. This signal is transmitted through a horn (antenna) towards the radar system antenna. The horns that are used in these target simulation systems are not easily movable. Therefore, it is difficult to simulate a target moving in azimuth or elevation. Also, the transmission of the radio frequency target signal through such a horn can create external interference problems with nearby receivers. The radar system antenna will also receive the signals of nearby transmitters In addition, a minimum distance of clear area is required between the horn and radar antennas to overcome the near-field effects on the antenna patterns.

SUMMARY OF THE INVENTION

We provide a system which simulates a target moving in relation to a radar tracking system. The radar tracking system is equipped with an antenna and a receiver for receiving input from the antenna. The antenna receives an angle versus power propagation pattern which is steerable in selected directions. The present target simulation system operates in conjunction with a target generator that produces a radio frequency signal representing the target. An operator inputs into the target simulation system an analog signal that represents the azimuth position of the target with respect to the radar platform boresight. An analog signal which represents the azimuth position of the antenna is then summed with the analog target azimuth position signal. This summing of the analog azimuth signals, which may be performed by an operational amplifier, provides a summed analog azimuth position signal. A first analog to digital converter is then employed for converting samples of the summed analog azimuth position signals from analog signals to digital code.

Similarly, an operator inputs an analog signal representing an elevation position of the target with respect to the radar platform boresight. Analog signals representing an elevation position of the antenna are then summed with the analog target elevation position signal to provide a summed analog elevation position signal. A second analog to digital converter then converts samples of the summed analog elevation position signals from analog signals to digital code.

Additionally, data is acquired which represents the direction in which the antenna propagation pattern is steered. An address converter then converts the antenna propagation pattern direction data into digital code. The combined azimuth position digital code and the propagation pattern direction digital code are then inputted into a first memory unit which outputs a stored azimuth attenuation digital code. Similarly, the summed elevation position digital code and the propagation pattern direction digital code are inputted into a second memory unit which outputs a stored elevation attenuation digital code. The first memory unit and second memory unit are preferably programmable read only memory units. The azimuth attenuation digital code and the elevation attenuation digital code are then combined using a square root of the sum of the squares function. The combined attenuation digital code is then converted in a digital to analog converter to yield a combined attenuation analog signal. The attenuation analog signal is used to control an attenuator through which the radio frequency signal representing the target from the target frequency signal representing the target from the target generator is passed. A PIN diode is typically used as the attenuator in which the amount of attenuation is controlled by the attenuation analog signal dc bias voltage. The attenuated target generator signal is then input into the receiver of the radar tracking system.

As an alternative, the azimuth attenuation digital code and the elevation attenuation digital code may be first converted to analog signals in respective digital to analog converters before being combined by an analog square root of the sum of the squares function.

DESCRIPTION OF THE PREFERRED EMBODIMENT

Figure 1:
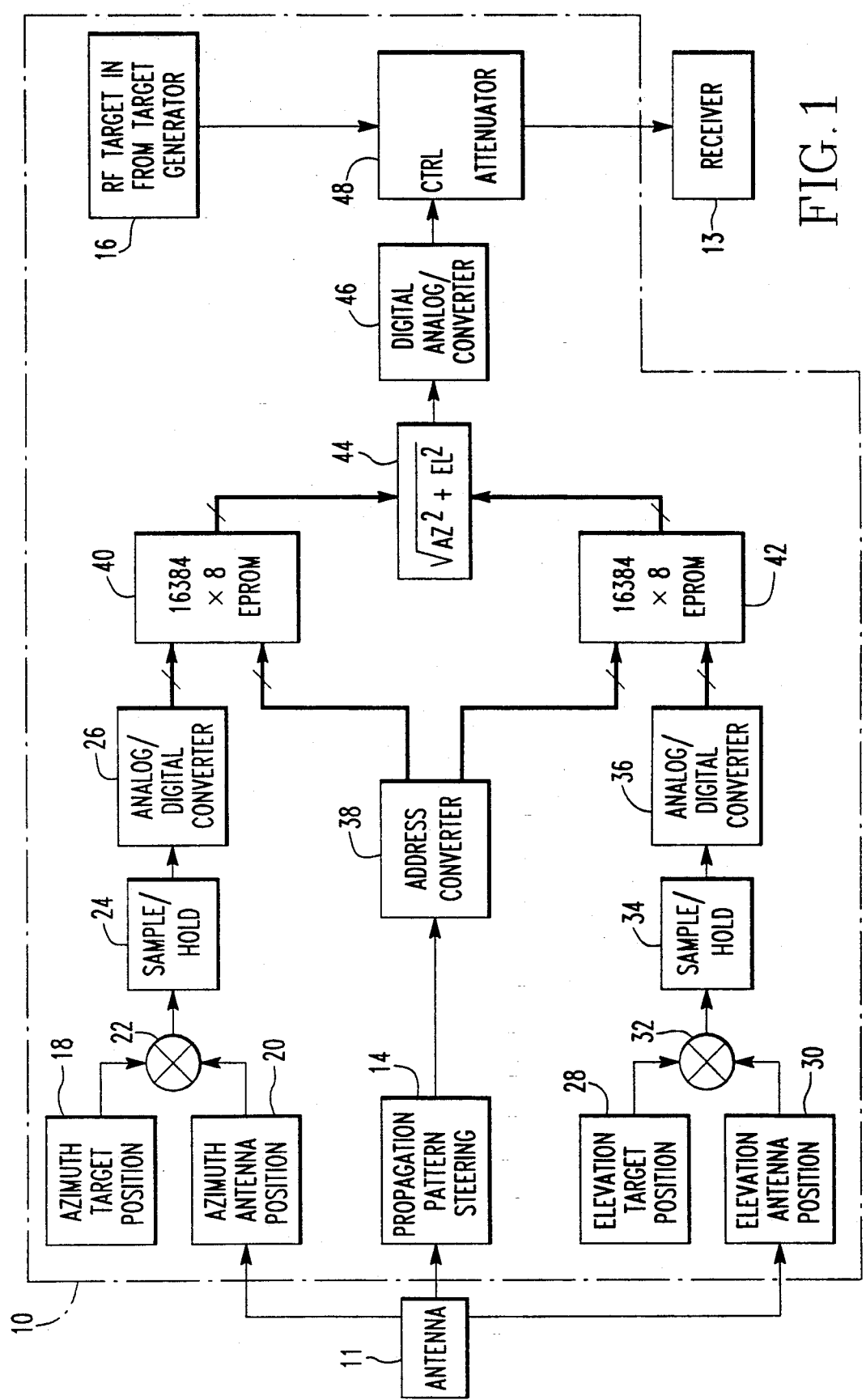
FIG. 1 is a functional block diagram of the present present preferred azimuth elevation target simulation system.

Referring first to FIG. 1, a functional block diagram is provided which shows a system 10 for simulating a target moving in relation to a radar tracking system. The radar tracking system is equipped with an antenna 11 and a receiver 13 for receiving input from the antenna 11. The tracking system is typically fixed to a radar platform which could be an aircraft, vehicle, ship or the earth. The radar tracking system antenna 11 propagates a radar propagation pattern which is both mechanically and electronically steerable in selected directions. The present target simulation system 10 operates in conjunction with a target generator 16 that produces a radio frequency signal representing the target.

An operator inputs into the target simulation system 10 an analog signal 18 that represents the azimuth position of the target with respect to the radar platform. The azimuth target position 18 is chosen and set by the operator and represents the desired position for the target in azimuth. The azimuth angle of the target is measured from boresight. Boresight is the position at the center of the antenna mechanical scanning, which is typically directly in front of the radar platform. The analog input representing the azimuth target position is preferably a dc voltage. Thus, the operator may input this analog signal by adjusting a potentiometer. For example, a zero volt input could represent zero degrees (0°) in azimuth from boresight, and a negative 10 volt input could represent minus thirty degrees (−30°) in azimuth from boresight and a positive ten volt input could represent thirty degrees (30°) in azimuth from boresight. By changing the voltage input over time, the operator may provide an azimuth target position signal 18 that represents a target moving in azimuth.

An analog signal 20 which represents the azimuth position of the antenna 11 is then obtained. The antenna 11 physically rotates in the azimuthal direction over time. The analog signal 20 representing the azimuth antenna position may be derived from the actual position of the antenna 11 from the radar antenna's test voltages. Alternatively, an analog signal 20 representing the azimuth position of an antenna may be created and input into the system 10 from a source other than the radar antenna 11. Thus, the antenna 11 need not be physically attached to the system 10 to perform the target simulation.

The analog antenna azimuth position signal 20 is then summed with the analog target azimuth position signal 18 at a first summing unit 22. This summing of the analog azimuth signals 18, 20, which may be performed by an operational amplifier, provides a summed analog azimuth position of the simulated target relative to the center of the antenna receive pattern. The summed analog azimuth position signals are then sampled in a first sample/hold circuit 24. The first sample/hold circuit 24 is an electric circuit that periodically samples a changing analog voltage, then holds the output to a stable value until the next sample is performed. A first analog to digital converter 26 is then employed for converting the samples of the summed analog azimuth position signals from analog signals to digital code.

Similarly, an operator inputs an analog signal 28 representing an elevation position of the target with respect to the radar platform. The elevation target position 28 is chosen and set by the operator and represents the desired position for the target in elevation. The elevation angle of the target is measured from boresight. The analog input representing the elevation target position 28 is preferably a dc voltage. Thus, the operator may input this analog signal by adjusting a potentiometer. For example, a zero volt input could represent zero degrees (0°) in elevation from boresight, and a negative ten volt input could represent minus thirty degrees (−30°) in elevation from boresight and a positive ten volt input could represent thirty degrees (30°) in elevation from boresight. And by changing the voltage input over time, the operator may provide a target elevation position signal 28 that represents a target moving in elevation.

An analog signal 30 representing an elevation position of the antenna 11 is then obtained. The antenna 11 physically rotates in the elevational direction over time. The analog signal 30 representing the elevation antenna position may be derived from the actual position of the antenna 11 from the radar antenna's test voltages. Alternatively, an analog signal 30 representing the elevation position of an antenna may be created and input into the system 10 from a source other than the radar antenna 11. Thus, the antenna 11 need not be physically attached to the system to perform the target simulation.

The analog antenna elevation position signal 30 is then summed with the analog target elevation position signal 28 at a second summing unit 32. This summing of the analog elevation signals 28, 30, which may be performed by an operational amplifier, provides a summed analog elevation position of the simulated target relative to the antenna receive pattern. The summed analog elevation position signals are then sampled in a second sample/hold circuit 34. A second analog to digital converter 36 then converts the samples of the summed analog elevation position signals from analog signals to digital code.

Additionally, data 14 is acquired which represents the direction in which the antenna propagation pattern is electronically steered. The electronic propagation pattern steering information 14 is entered in the form of serial digit data. The data is acquired through connections to the control inputs of the antenna phase shifters or through intermediate communications controlling them. The information is then converted in an address converter 38 to a two bit address to determine the antenna propagation pattern's steering position. The combined azimuth position digital code and the propagation pattern steering digital code are then inputted into a first memory unit 40 which outputs a stored azimuth attenuation digital code. Similarly, the combined elevation position digital code and the propagation pattern direction digital code are inputted into a second memory unit 42 which outputs a stored elevation attenuation digital code. The first memory unit 40 and second memory unit 42 are preferably programmable read only memory units.

The azimuth attenuation digital code (AZ) and the elevation attenuation digital code (EL) are combined using a combining function 44. The combining function 44 is a square root of the sum of the squares function given by:

$$(Az^2+EL^2)^{\frac{1}{2}}$$

This combining function 44 performs an approximation of the antenna pattern when the target position differs from the center of the antenna pattern by both azimuth and elevation.

This combining function 44 is preferably performed by a programmable read only memory. The azimuth attenuation digital code is input as the low-order addresses. The elevation attenuation digital code is input as the upper order addresses. The data output corresponds to the square root of the sum of the squares of the input.

The combined attenuation digital code is then converted in a digital to analog converter 46 to yield a combined attenuation analog signal. The combined attenuation analog signal is used to control an attenuator 48 through which the radio frequency signal representing the target from the target generator 16 is passed. A PIN diode based attenuator is typically used as the attenuator 48 since it responds relatively quickly to a change in control voltage. The amount of attenuation in the attenuator 48 is controlled by the combined attenuation analog signal. The attenuated target generator signal is then input into the receiver 13 of the radar tracking system.

Figure 2:
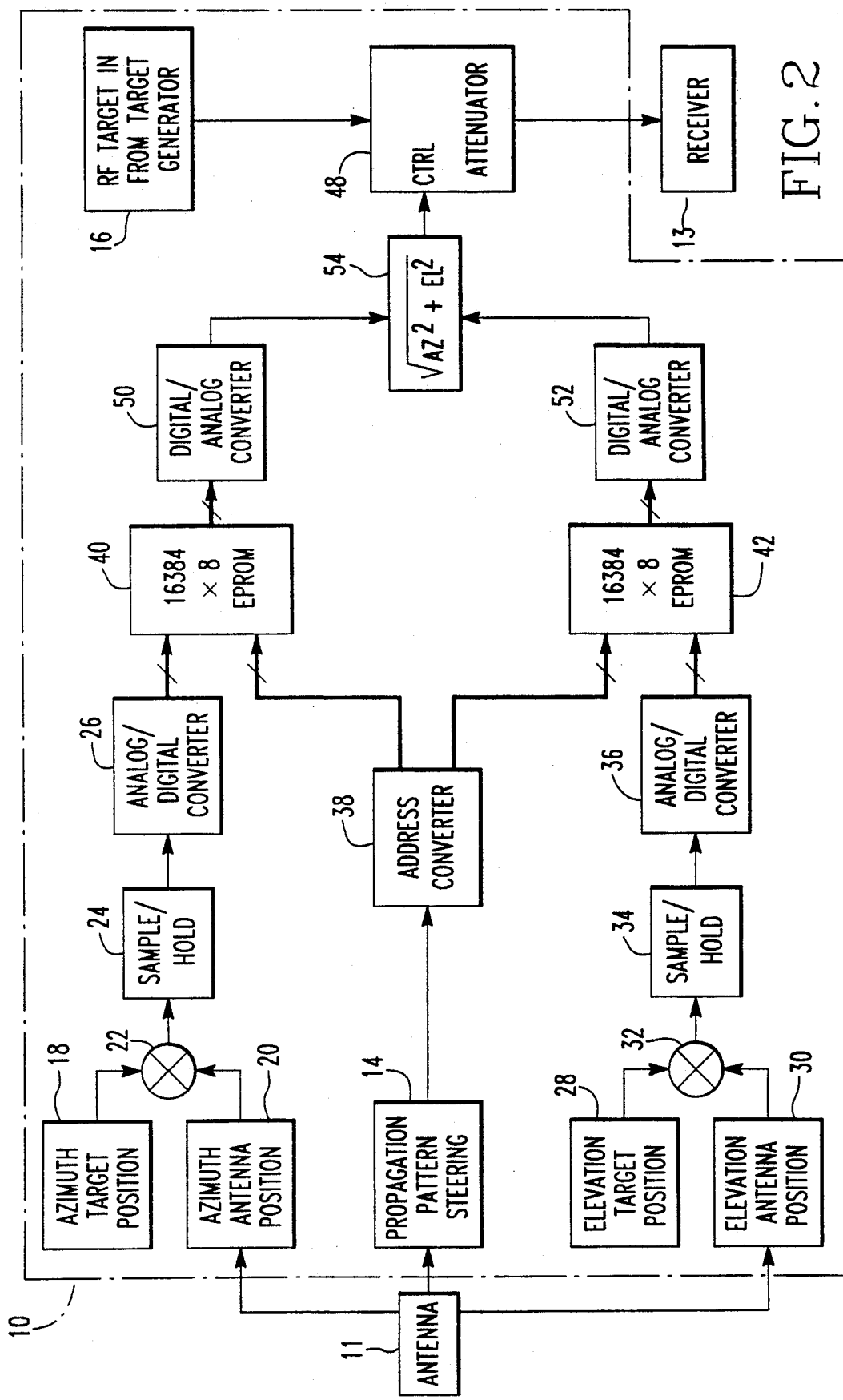
FIG. 2 is a functional block diagram of a variation of the present preferred azimuth elevation target simulation system.

Variations of the preferred embodiment could be made. For example, as shown in FIG. 2, the identified method and system described above is employed except that the azimuth attenuation digital code and the elevation attenuation digital code may be first converted to analog signals in respective digital to analog converters 50, 52 before being combined by an analog square root of the sum of the squares function 54. This embodiment is otherwise similar to the preferred embodiment.

Figure 3:
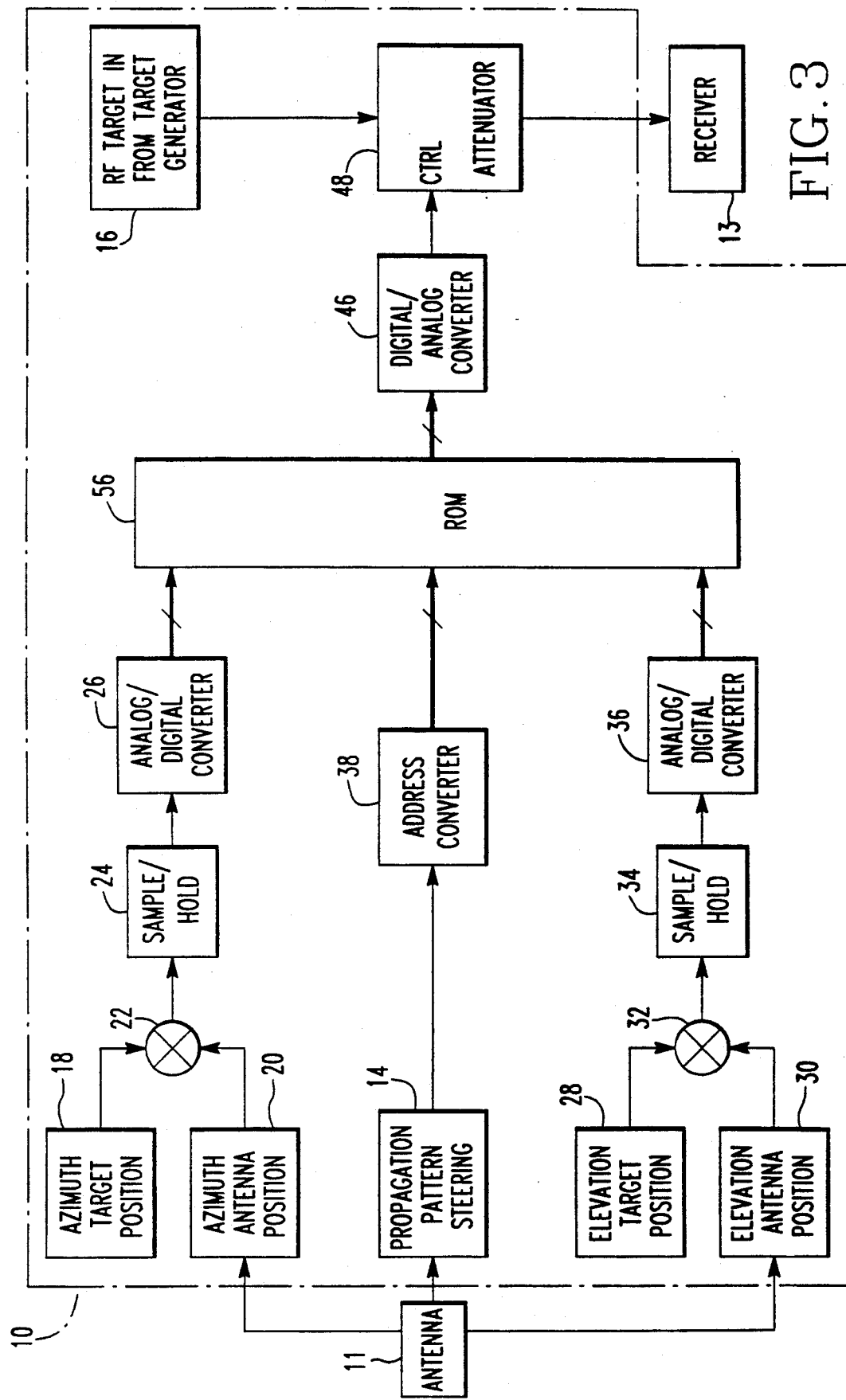
FIG. 3 is a function block diagram of another variation of the present preferred azimuth elevation target simulation system.

An additional embodiment shown in FIG. 3, is similar to the preferred embodiment except that the programmable read only memories are all combined into one. The address input consists of the azimuth and elevation target position signals 18, 28 relative to the center of the antenna receiver pattern, and the antenna electronic propagation pattern steering data 14. The data output of the programmable read only memory unit 56 corresponds to the antenna receive pattern, based on all inputs. The sum of the squares approximation is not needed and the simulated pattern will be more accurate. The resolution and number of input bits will have to be adjusted to correspond to available memory sizes.

Also, it has been shown that analog signals 20, 30 representing the azimuth and elevation positions of the antenna 11 may be created and input into the system 10 from a source other than the antenna 11, summed with analog target position signals 18, 28 and converted to digital code. However, the information representing the azimuth and elevation positions of the antenna 11 may be input into the system as digital code. Thus, the analog target azimuth and elevation position signals can be converted to digital code and then summed with the digital code representing the respective azimuth and elevation antenna position.

Similarly, the target position information may be input as digital code. Thus the analog signals representing the azimuth and elevation positions of the antenna 11 may be converted to digital code in respective analog to digital converters. Then the digital code representing the antenna position may be summed with the digital code representing the target position.

Finally in a complete simulation, both the antenna position information and target position information are input as digital code. In this alternative, there is no need for an analog to digital converter. The digital code representing the respective antenna and target positions are summed for azimuth and elevation and then sent to the memory units.

While a present preferred embodiment has been shown and described it is distinctly understood that the invention is not limited thereto but may be otherwise embodied within the scope of the following claims.

I claim:

1. A system for simulating a target signal for input into a receiver of a radar system having an antenna and a receiver for receiving input from the antenna, both the antenna and the receiver being on a radar platform, the radar system also having an antenna propagation pattern which is steered in selected directions, comprising:
    (a) a target generator for producing a radio frequency signal representing the target;
    (b) a means for providing an analog signal representing an azimuth position of the target with respect to the radar platform;
    (c) a means for providing an analog signal representing an azimuth position of the antenna with respect to the radar platform;
    (d) a means for summing the analog target azimuth position signal with the analog antenna azimuth position signal to provide a summed analog target azimuth position signal with respect to the radar platform;
    (e) a first sample/hold and a first analog to digital converter for converting samples of the summed analog azimuth position signals from analog signals to digital code;
    (f) a means for providing an analog signal representing an elevation position of the target with respect to the radar platform;
    (g) a means for providing an analog signal representing an elevation position of the antenna with respect to the radar platform;
    (h) a means for summing the analog target elevation position signal with the analog antenna elevation position signal to provide a summed analog target elevation position signal with respect to the radar platform;
    (i) a second sample/hold and a second analog to digital converter for converting samples of the summed analog elevation position signals from analog signals to digital code;
    (j) a means for providing data representing the direction in which the antenna propagation pattern is electronically steered;
    (k) a means for converting the antenna propagation pattern electronic steering direction data to digital code;
    (l) a first memory unit that accepts as input the summed azimuth position digital code and the propagation pattern direction digital code and which outputs a stored azimuth attenuation digital code;
    (m) a second memory unit that accepts as input the summed elevation position digital code and the propagation pattern direction digital code and which outputs a stored elevation attenuation digital code;
    (n) a means for combining the azimuth attenuation digital code and the elevation attenuation digital code so as to yield a combined attenuation digital code;
    (o) a digital to analog converter for converting the combined attenuation digital code to a combined attenuation analog signal; and
    (p) a means for attenuating the target generator signal, wherein the amount of attenuation is dependent upon the combined attenuation analog signal.

2. The system for simulating a target of claim 1 wherein the first memory unit and the second memory unit are read only memory units.

3. The system for simulating a target of claim 2 wherein the read only memory units are erasable programmable read only memory units.

4. The system for simulating a target of claim 1 wherein the means for combining the azimuth attenuation digital code and the elevation attenuation digital code comprises means for squaring the azimuth attenuation digital code and squaring the elevation attenuation digital code, then summing the squared azimuth attenuation digital code and the squared elevation attenuation digital code, and then performing the square root of the sum of the squared azimuth attenuation digital code and the squared elevation attenuation digital code.

5. The system for simulating a target of claim 1 wherein the means for attenuating the target generator signal is a PIN diode attenuator.

6. A system for simulating a target signal for input into a receiver of a radar system having an antenna, a receiver for receiving input from the antenna, both the antenna and the receiver being on a radar platform, the radar system also having a propagation pattern emitted form the antenna which is steered in selected directions comprising:

(a) a target generator for producing a radio frequency signal representing the target;
(b) a means for providing an analog signal representing an azimuth position of the target with respect to the radar platform;
(c) a means for providing an analog signal representing an azimuth position of the antenna with respect to the radar platform;
(d) a means for summing the analog target azimuth position signal with the analog antenna azimuth position signal to provide a summed analog target azimuth position signal with respect to the radar platform;
(e) a first sample/hold and a first analog to digital converter for converting samples of the summed azimuth position from analog signals to digital code;
(f) a means for providing an analog signal representing an elevation position of the target with respect to the radar platform;
(g) a means for providing an analog signal representing an elevation position of the antenna propagation pattern with respect to the radar platform;
(h) a means for summing the analog target elevation position signal with the analog antenna elevation position signal to provide a summed analog target elevation position signal with respect to the radar platform;
(i) a second sample/hold and a second analog to digital converter for converting samples of the summed elevation position from analog signals to digital code;
(j) a means for providing data representing the direction in which the antenna propagation pattern is electronically steered;
(k) a means for converting the antenna propagation pattern electronic steering direction data to digital code;
(l) a first memory unit that accepts as input the summed azimuth position digital code and the propagation pattern direction digital code and which outputs a stored azimuth attenuation digital code;
(m) a second memory unit that accepts as input the summed elevation position digital code and the propagation pattern direction digital code and which outputs a stored elevation attenuation digital code;
(n) a first digital to analog converter for converting the azimuth attenuation digital code to an azimuth attenuation analog signal;
(o) a second digital to analog converter for converting the elevation attenuation digital code to an elevation attenuation analog signal;
(p) a means for combining the azimuth attenuation digital code and the elevation attenuation digital code so as to yield a combined attenuation analog signal; and
(q) a means for attenuating the target generator signal, wherein the amount of attenuation is dependent upon the combined attenuation analog signal.

7. The system for simulating a target of claim 6 wherein the means for combining the azimuth attenuation analog signal and the elevation attenuation analog signal comprises means for squaring the azimuth attenuation analog signal and squaring the elevation attenuation analog signal, then summing the squared azimuth attenuation analog signal with the elevation attenuation analog signal, and then performing the square root of the sum of the squared azimuth attenuation analog signal and the squared elevation attenuation analog signal.

8. A method for simulating a target signal for input into a receiver of a radar system having an antenna, a receiver for receiving input from the antenna, both the antenna and the receiver being on a radar platform, the radar system also having a propagation pattern which is steered in selected directions comprising:

(a) producing from a target generator a radio frequency signal representing the target;
(b) obtaining analog signals representing an azimuth position of the target with respect to the radar platform;
(c) obtaining analog signals representing an azimuth position of the antenna with respect to the radar platform;
(d) summing the analog target azimuth position signal with the analog antenna azimuth position signal to provide a summed analog azimuth target positioning signal with respect to the radar platform;
(e) converting samples of the summed azimuth position from analog signals to digital code in a first sample/hold and a first analog to digital converter;
(f) obtaining an analog signal representing an elevation position of the target with respect to the radar platform;
(g) obtaining an analog signal representing an elevation position of the antenna with respect to the radar platform;
(h) summing of the analog target elevation position signal with the analog antenna elevation target position signal to provide a summed analog elevation position signal with respect to the antenna propagation pattern;
(i) converting samples of the summed elevation position from analog signals to digital code in a second sample-hold and a second analog to digital converter;
(j) obtaining data representing the direction in which the antenna propagation pattern is electronically steered;
(k) converting the antenna electronic propagation pattern steering direction data to digital code;
(l) inputting the summed azimuth position digital code and the propagation pattern direction digital code into a first memory unit such that a stored azimuth attenuation digital code is outputted;
(m) inputting the summed elevation position digital code and the propagation pattern direction digital code into a second memory unit so as to output a stored elevation attenuation digital code;
(n) combining the azimuth attenuation digital code and the elevation attenuation digital code so as to yield a combined attenuation digital code;
(o) converting the combined attenuation digital code to a combined attenuation analog signal in a digital to analog converter; and
(p) attenuating the target generator signal, wherein the amount of attenuation is dependent upon the combined attenuation analog signal.

* * * * *